June 26, 1962 H. A. DUBNER 3,041,460

MULTI-CELL IR SEARCH SYSTEM

Filed June 19, 1959 2 Sheets-Sheet 1

INVENTOR.
HARVEY A. DUBNER

BY [signature]
ATTORNEY

INVENTOR.
HARVEY A. DUBNER
BY [signature]
ATTORNEY

Patented June 26, 1962

3,041,460
MULTI-CELL IR SEARCH SYSTEM
Harvey A. Dubner, Westwood, N.J., assignor to ACF Industries, Incorporated, New York, N.Y., a corporation of New Jersey
Filed June 19, 1959, Ser. No. 821,577
10 Claims. (Cl. 250—203)

The invention is in a search system and in particular a multi-cell photosensitive search system employing commutation.

In some applications for search systems which are used to detect distant objects, it is desirable that the system have a comparatively large field of view for the application to which it is applied. In the past, it also has been found necessary to utilize a large number of moving parts in order that the system can scan or search a given field of view. Such devices have required optics formed with moving parts such as gimbals, as well as heavy components to provide reliability. Furthermore, devices of the type described, in the past have required pickoff devices to determine azimuth and elevation in accordance with the position of the scanning structure. Such devices have of necessity been bulky and complex and do not lend themselves to being placed in small packages nor being operated by simple circuitry.

It is therefore an object of this invention to provide a novel search system which has a minimum number of moving parts for scanning a large field of view.

It is another object of the invention to provide a novel search system which is relatively simple in design and construction requiring a minimum of circuitry.

It is a further object of the invention to provide a novel radiation sensitive search system having a minimum of moving parts of a high degree of mechanical reliability.

It is also an object of the invention to provide a novel and relatively simple search system sensitive to radiations and which is of minimum weight and readily adaptable to a small package.

The novel search system, in accordance with the invention, is one which utilizes a bank of cells formed in a single row or in an area pattern such as a mosaic. An optical system is provided which directs radiation onto the array of cells. Each cell is connected to one terminal of a commutator switch, whose rotor arm is connected to a source of relatively high potential. The cells are pulsed sequentially by a high voltage pulse to provide a signal substantially greater than the noise level of the cell, when light is directed onto the cell. The output of the cells is amplified. Filter circuits are connected between the commutator switch and each cell, as well as between the cells and the amplifier. The values of the components of the filter circuits are selected to attenuate high frequencies between the commutator switch and each cell and low frequencies between each cell and the amplifier. The system provides a device in which the bias of each cell is sequentially commutated so that the cell, during its short period of operation, can be operated at many times the value of its maximum continuous bias voltage. This operation provides an output signal many times that available when the cells are continuously operated, which type of operation improves the signal to noise ratio of the system.

FIG. 1 is a schematic showing in perspective of a novel search system in accordance with the invention.

FIG. 1*a* is a perspective view of a photosensitive cell utilized in the present invention.

Figures 1, 1A:
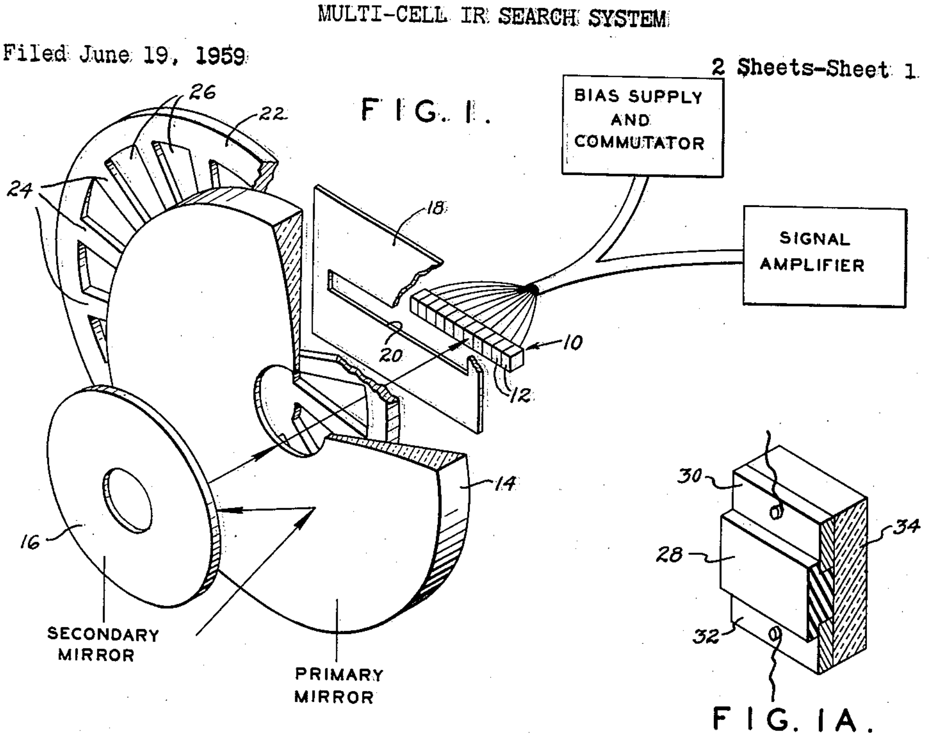

The novel search system is shown in FIG. 1 and consists principally of an array 10 of a plurality of photosensitive cells 12. In FIG. 1, cells 12 are arranged adjacent to each other in a straight line. Radiation from the field of view is directed onto the array of cells 12 by being reflected first from a primary spherical concave mirror 14, from which it is directed onto a secondary plane mirror 16. Radiation from mirror 16 is reflected through the open center of mirror 14 in a path striking any one of the cells 12. A masking diaphragm 18 is positioned in front of the array of cells 10 and includes a slot 20 for defining the direction of light falling upon the cell array 10. Positioned in the path of radiation between mirror 16 and the cell array 10 is a light chopping wheel 22, mounted for rotation in a plane substantially normal to the radiation path between mirror 16 and the cell array 10. The particular chopping wheel, shown in FIG. 1, is that having spokes 24 and cutout portions 26 to chop the radiation falling upon any one of the cells 12 into short pulses. The chopping wheel 22 is rotated by an appropriate motor means (not shown), which is caused to drive the wheel 22 at a speed providing a chopping frequency of approximately 1000 c.p.s. For example, the chopping wheel 22 may be one having a total of eighteen slots 26 and be driven by a 60 cycle motor, which produces a chopping frequency of 1080 c.p.s.

The focal plane of the optics formed by mirrors 14 and 16 is one which may occur about ¼ of an inch behind the primary mirror 14. The array 10 of the photosensitive cells is mounted at this focal plane with the slotted diaphragm 18 immediately in front of the cell array 10. The mirrors 14 and 16 may be of any desired type. If the radiation received by the search system lies within the infrared portion of the spectrum, the mirrors 14 and 16 may be formed of a filter glass of a type to eliminate radiation in the visual portion of the spectrum.

FIG. 1*a* discloses a typical photosensitive cell, which may be utilized in the cell array 10 of the system of FIG. 1. Each cell consists of a deposit of photoconductive metal 28 bridging a pair of conductive electrode coatings 30 and 32. The cell elements 28, 30 and 32 may be formed as layers on an insulating support structure 34. The area of the photoconductive deposit 28 of each cell 12 is in the order of one millimeter by one millimeter. The photosensitive material of element 28 may be of any appropriate infrared sensitive, photoconductive material, such as lead sulfide or lead telluride. Other photoconductive materials may also be used which are sensitive to radiation in other portions of the spectrum, if the search system is to be adapted for such radiation.

FIG. 1 discloses an array of ten photoconductive cells 12. With an optical system of the type shown in FIG. 1, cells of the size described, provide a field of view for each cell of 1.4° in azimuth and elevation. Thus, the array of cells 10 in FIG. 1 provides a field of view of 1.4° in one dimension and 14° in the other.

Figure 2:
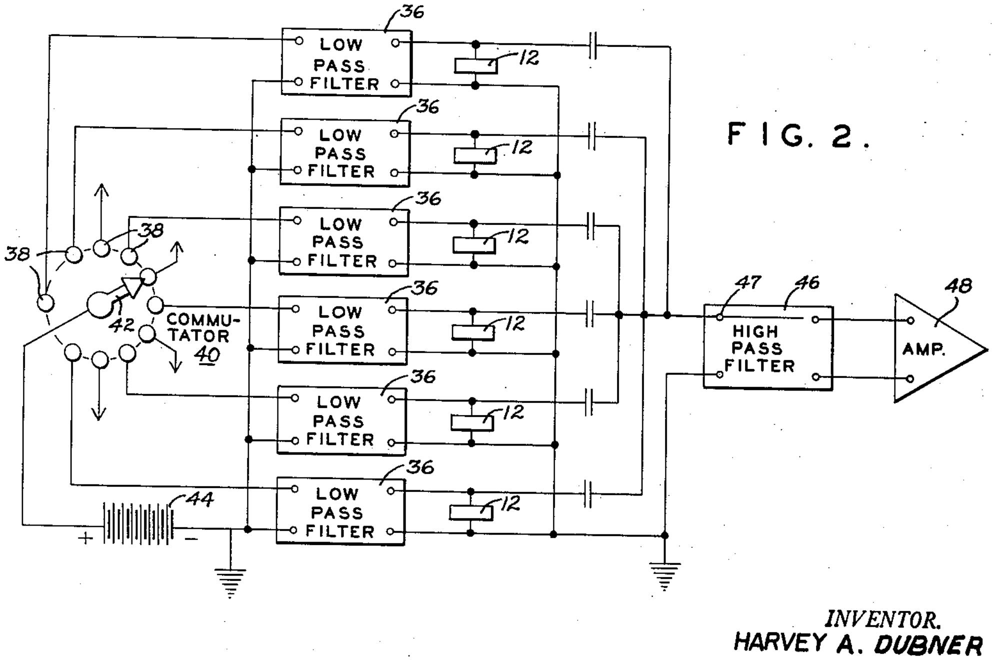
FIG. 2 is a schematic block diagram of the photosensitive portion of the system of FIG. 1.

To interpret the output from any one cell, due to radiation striking the cell, the system utilizes a detecting and amplifying arrangement shown in FIG. 2. Each cell 12 is connected through a voltage dropping resistor 11, and a low band pass bias filter 36 to a fixed terminal 38 of a commutator 40. The rotor arm 42 of commutator 40 is connected to one side of a direct current voltage source 44. The other side of the voltage source 44 is grounded, as well as the other side of each of the low pass filters 36. The output of each cell 12 is capacitively coupled through capacitors 15 to one side of a high band pass input filter 46, the other side of which is grounded. Filter 46 serves to feed the output of each cell 12 to an amplifier circuit 48. Commutator rotor 42 is driven by a motor (not shown) at 1 r.p.s., so that each cell 12 is pulled once per second.

Figure 3:
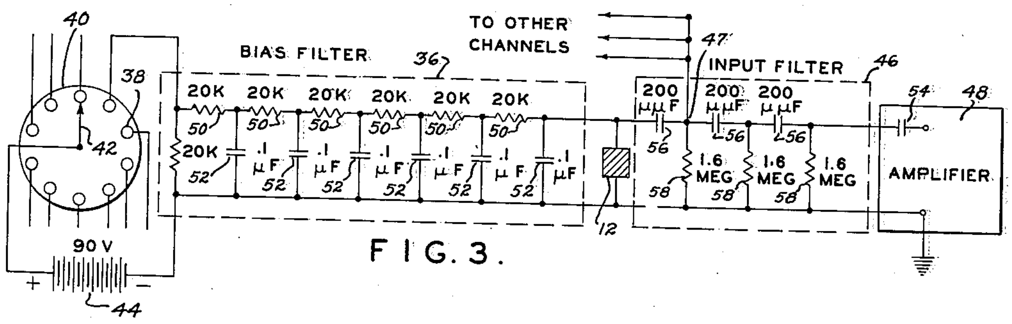
FIG. 3 is a circuit diagram of a portion of the system of FIGS. 1 and 2.

FIG. 3 discloses the details of one of the low band pass filters 36, as well as the arrangement of the high pass input filter 46. Only a single filter circuit 36 is disclosed for the purpose of simplifying the drawing. It is understood, however, that each of the low pass bias filters 36 in FIG. 2 are substantially identical to the single filter circuit shown in FIG. 3. The circuit of each bias filter 36 consists of a six-stage R.-C. filter.

Each stage of the filter circuit 36, in a successfully operated device of the type described, consists of a resistor 50 of 20,000 ohms and a condenser 52 of 0.1 microfarad. With a source of voltage 44 of 90 volts D.C., these values of resistors 50 and condensers 52 provide the bias filter circuit 36 with a cutoff of approximately 80 c.p.s. and a characteristic, which will attenuate a signal in the order of 1000 c.p.s. by a factor of $10^6$. This filter circuit 36 is connected between commutator 40 and each cell 12 to reduce the high frequency components of the bias pulse applied to cell 12 when the rotor arm 42 strikes the particular terminal 38, to which the filter circuit 36 is connected. This reduction of the high frequency components of the bias pulse reduces the noise level of the high frequency signal fed from cell 12 to the amplifier 48.

The bias pulse reaching the amplifier 48 through a single coupling capacitor 54 would normally be large enough to cause the generation of harmonics in the preamplifier section of the circuit 48. These harmonics would produce additional noise in the pass band of the amplifier which is tuned to 1080 c.p.s.±50 c.p.s. Thus, an input high pass filter 46 is connected between the output of each cell 12 and amplifier 48 as shown in FIGS. 2 and 3. The input filter circuit consists substantially of three stages, each including a 200 microfarad condenser 56 and a 1.6 megohm resistor 58. Such a filter attenuates the 10 c.p.s. bias pulse in the order of 50 volts to 500 microvolts. The circuit of the input filter 46, however, has minimum attenuation at 1080 c.p.s., the radiation chopping frequency.

As disclosed in both FIGS. 2 and 3 the cells are connected through the coupling capacitors 15 in parallel to the input terminal 47 of the high pass input filter 46. The loading effect of the other cells 12 as well as the parallel filter circuits 36 will attenuate the signal of any one cell by a factor of $1/n$, where $n$ is the number of paralleled cells. This parallel arrangement of the circuits provides a substantial reduction in the signal level of each cell and a typical signal of 25 microvolts at any one of the 10 or more cells in parallel will be attenuated into the region of the normal noise level of amplifier 48.

In accordance with the invention, the signal level of each cell is raised by increasing the bias voltage on the cell. Since the bias is applied to each cell for $1/n$ second every second, there is little danger of power dissipation in the cell when an excessively high voltage is applied. For example, the maximum continuous bias voltage that can be applied to a 2 mm. by 2 mm. lead sulfide cell is in the order of 25 volts. It has been recognized that, with such a cell, the bias in short pulses in the order of 50 to 100 milliseconds may be applied equal to 10 times the maximum continuous bias. This would indicate that a maximum bias pulse as high as 250 volts can be applied to a 2 mm. by 2 mm. cell. A normal operating bias for 2 mm. by 2 mm. lead sulfide cell is 5 volts. Using a safety factor of ten, it is reasonable to increase the bias of such cell to 25 volts in short pulses. Since the limiting factor on the cell bias is basically a thermal effect, it is possible that where cooled cells are used, the pulsed biased voltage could be increased even farther.

The technique of operating the photoconductive cells 12 at a high pulsed bias voltage requires that the cell have sufficient time to recover from the bias pulses. In the array of 10 cells indicated in FIGS. 1, 2 and 3, there is sufficient time in one second for such a recovery. Since the bias is on each cell for a fraction of a second, there is no gradual noise increase provided by the cell as in the case of a continuously applied bias voltage.

Figure 4:
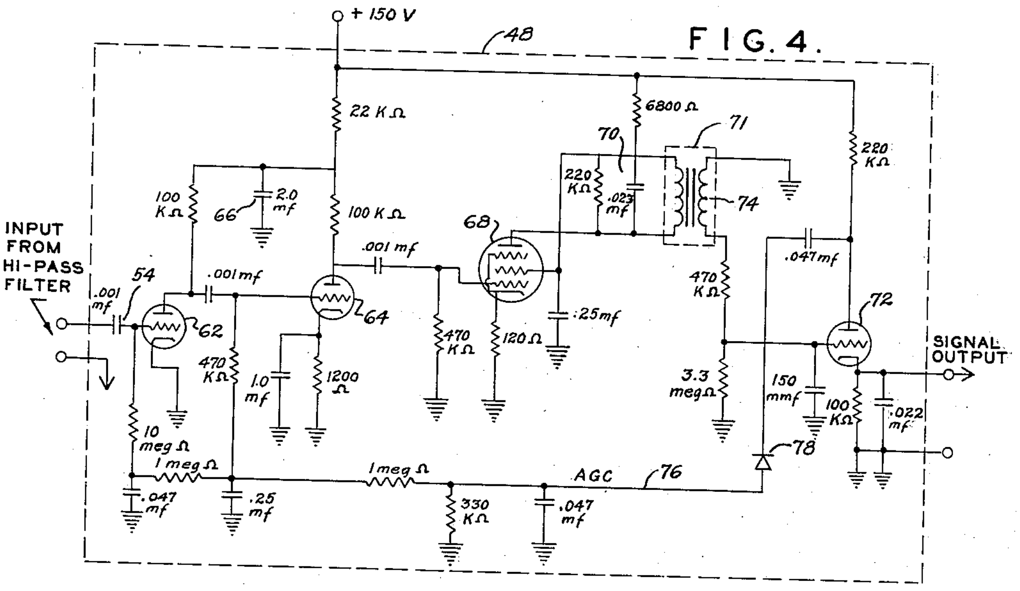
FIG. 4 is a circuit diagram of the amplifier section indicated in FIGS. 2 and 3.

The details of an amplifier 48 which may be used with the system described above is shown in detail in FIG. 4. As mentioned above, the output from the high band pass filter is capacitively coupled to the grid of a preamplifier tube 62, the plate circuit of which is capacitively coupled to the control grid of a second amplifier tube 64, which constitutes the first stage of a three-stage amplifier section. The low frequency portion of the amplified signal of the plate circuit of tube 62 is bypassed to ground by capacitor 66 connected in the plate circuit. The output from the amplifier tube 64 is capacitively coupled directly to the first grid of pentode tube 68 constituting the second stage of the amplifier section. The plate circuit of pentode 68 includes a circuit portion 70 consisting of a resistance, a capacitance and an inductance connected in parallel. This circuit portion 70 is tuned to the chopping frequency of the system which, in the device described above, is 1080 c.p.s., with a bandwidth of 100 c.p.s. The selection of the bandwidth of the tuned circuit portion 70 is determined by the time on target. The amplifier bandwidth must be broad enough to allow energy build-up during time on target. For the search system as described, time on target may be approximately 0.005 second which has been determined to require a 60 cycle per second bandwidth. The actual bandwidth provided, however, is 100 c.p.s. to allow for chopping speed variations.

The inductance of the tuned circuit portion 70 constitutes the primary coil of a coupling transformer 71 between the plate circuit of tube 68 and the control grid circuit of the third stage amplifier tube 72. The control grid circuit of tube 72, includes coil 74, which is the secondary coil of the coupling transformer 71. The plate circuit of amplifier tube 72 is capacitively coupled to an automatic gain control circuit 76, which is tied back to the control grid of the first stage amplifier tube 64 through a diode 78. The use of automatic gain control in the amplifier 48 is for the purpose of maintaining the average noise output of the system constant, as would be required for a threshold type of presentation. The effect of the noise signal on the amplifier output should be small because of the short time on target. The automatic gain control time constant must be long enough to avoid an effect on the target signal or blanking after a target signal. A value of 0.3 second can be used for this time constant.

The tuned amplifier circuit described above and as disclosed in FIG. 4 is one which discriminates in favor of the desired target signal and against background noise. The output of the amplifier may be utilized in any appropriate manner, as for example, to apply a visual representation by means of an oscilloscope in conjunction with a pick-off device for each terminal of the commutator. The signal output may also be used to control the guidance mechanism of any vehicle for example.

Figure 5:
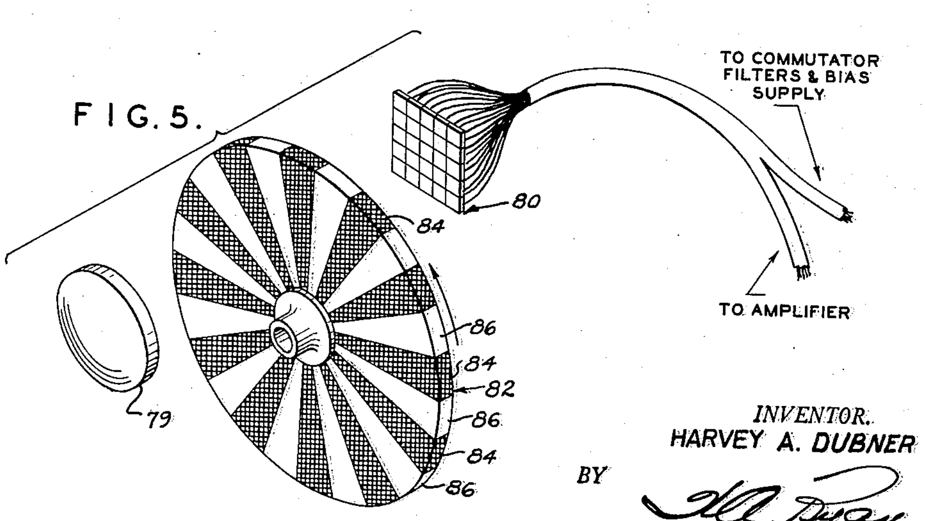
FIG. 5 is a schematic representation in perspective of a modification of the invention of FIG. 1.

FIG. 5 discloses another form of applicant's invention. In this system radiation is collected and focused by an optical system 79 onto a mosaic 80 of photocells in which the arrangement of cells provides a square area configuration. The optical system 79 may be of any appropriate design and is schematically shown in FIG. 5 as a single lens. Positioned between the optical system 79 and the photosensitive mosaic 80 is a chopping wheel 82 consisting of opaque portions 84 separated by radiation transparent portions 86. The chopping wheel 82 may be made of solid material having opaque and transparent portions as an alternate form to the spoked wheel 22 of FIG. 1.

If the mosaic 80 is formed of cells 1 mm. by 1 mm. and similar to cells 12 of FIG. 1, the mosaic will intercept a field of view equal to 14° by 14°, when the mosaic has 10 cells on a side. The filtering and amplifying circuits of the system of FIG. 5 are similar to those described above for the system of FIGS. 1 through 4. They are omitted from FIG. 5 for the purpose of simplifying the presentation. However, the system of FIG. 5, also is operated in a manner in which each cell of the mosaic 80 is pulsed in sequence by connecting the cells to a commutator and a source of potential in the manner shown in FIG. 2. This then provides a high voltage pulse applied to the cell for a very short period of time. This, as described above for the system of FIGS. 1 through 4, provides a greater signal-to-noise ratio.

Certain structures have been described herein which will fulfill all the objects of the present invention, but it is contemplated that other modifications will be obvious to those skilled in the art which come within the scope of the invention as defined by the appended claims.

I claim:

1. A search system comprising a photosensitive device, means for projecting radiation along a path onto said photosensitive device, said photosensitive device including a plurality of semiconductor photoconductive cells and a source of potential and means connecting said potential source to said photoconductive cells, said connecting means including structure for applying voltage pulses to said photoconductive cells sequentially, and a common output circuit connected to said cells.

2. A search system comprising a photosensitive device, means for projecting radiation along a path onto said photosensitive device, said photosensitive device including a plurality of solid semiconductor photocells and a source of potential, means connecting said potential source to said photocells, said connecting means including structure for applying at a periodic frequency voltage pulses to said photocells sequentially, means positioned in said radiation path to periodically at a second frequency intercept said radiation projected onto said photosensitive device and an output circuit connected to all said photocells.

3. A search system comprising a photosensitive device, means for projecting radiation along a path onto said photosensitive device, said photosensitive device including a photocell and a source of potential, means connecting said potential source to said photocell, said connecting means including a switching device for periodically applying voltage pulses to said photocell, a signal amplifying circuit connected across said photocell, and a filter circuit between said amplifying circuit and said photocell to attenuate frequencies generated by said switching device.

4. A search system comprising a photosensitive device, means rof projecting radiation along a path onto said photosensitive device, said photosensitive device including a photocell and a source of potential, a switching device connected between said photocell and said potential source for periodically applying voltage pulses to said photocell, a signal amplifying circuit connected across said photocell, a first filter circuit between said amplifying circuit and said photocell to attenuate high frequencies generated by said switching device, and a second filter circuit connected between said switching device and said photocell to attenuate low frequencies generated by said switching device.

5. A search system comprising a plurality of photosensitive cells, means for projecting radiation from a limited field of view along a path onto any one of said photosensitive cells, a source of potential, a commutator switch having a pivoted rotor arm and a plurality of terminals fixed in the path of said rotor arm, motor means connected to said rotor arm to rotate said rotor arm to strike each one of said terminals in sequence, a plurality of filter circuits, each one of said filter circuits connecting each of said switch terminals to a different one of said photosensitive cells to attenuate frequencies generated by said commutator switch, and means connected to said cells to amplify the output from said cells.

6. A search system comprising a plurality of photosensitive cells, means for projecting radiation from a limited field of view along a path onto any one of said photosensitive cells, a light, a source of potential, a commutator switch having a pivoted rotor arm and a plurality of terminals fixed in the path of said rotor arm, motor means connected to said rotor arm to rotate said rotor arm to strike each one of said terminals in sequence, a plurality of filter circuits, each one of said filter circuits connecting each of said switch terminals to a different one of said photosensitive cells to attenuate high frequencies generated by said commutator switch, an amplifier circuit connected to said cells to amplify the output from said cells, and an input filter circuit connected between said cells and said amplifier circuit to attenuate low frequencies generated by said commutator switch.

7. A search system comprising a plurality of photosensitive cells, means for projecting radiation from a limited field of view along a path onto any one of said photosensitive cells, a light chopper positioned in said radiation path to vary said radiation at a predetermined frequency, a source of potential, a commutator switch having a pivoted rotor arm and a plurality of terminals fixed in the path of said rotor arm, motor means connected to said rotor arm to rotate said rotor arm to strike each one of said terminals at a frequency lower than said predetermined chopper frequency, a plurality of filter circuits connecting each of said switch terminals to a different one of said photosensitive cells to attenuate frequencies generated by said commutator switch, and means connected to said cells to amplify the output from said cells.

8. A search system comprising a plurality of photosensitive cells, means for projecting radiation from a limited field of view along a path onto any one of said photosensitive cells, a light chopper positioned in said radiation path to vary said radiation at a predetermined frequency, a source of potential, a commutator switch having a pivoted rotor arm and a plurality of terminals fixed in the path of said rotor arm, motor means connected to said rotor arm to rotate said rotor arm to strike each one of said terminals at a frequency lower than said predetermined chopper frequency, a plurality of filter circuits connecting each of said switch terminals to a different one of said photosensitive cells to attenuate frequencies in the order of said chopper frequency and generated by said commutator switch, an amplifier circuit connected to said cells to amplify the output from said cells, and an input filter circuit connected between said cells and said amplifier circuit to attenuate high frequencies with respect to said chopper frequency and generated by said commutator switch.

9. A search system comprising a plurality of photosensitive cells, means for projecting radiation from a limited field of view along a path onto any one of said photosensitive cells, a source of potential, a commutator switch having a pivoted rotor arm and a plurality of terminals fixed in the path of said rotor arm, motor means connected to said rotor arm to rotate said rotor arm to strike each one of said terminals in sequence, a plurality of filter circuits, each one of said filter circuits connecting a different one of said photosensitive cells to attenuate high frequencies generated by said commutator switch, an amplifier circuit, an input filter circuit connected to said amplifier circuit to attenuate low frequencies generated by said commutator switch, and means connecting said cells in parallel to said input filter circuit.

10. A search system comprising a plurality of photoconductive cells, means for directing a radiant energy signal from a target directed onto said photoconductive cells, an output circuit connected to said cells, means for applying pulses of biasing voltage to said cells one at a time to increase the signal to noise ratio.

References Cited in the file of this patent

UNITED STATES PATENTS

| | | |
|---|---|---|
| 1,902,552 | Fulton | Mar. 21, 1933 |
| 2,965,762 | Turck | Dec. 20, 1960 |